(12) United States Patent
Kaiser et al.

(10) Patent No.: US 7,972,452 B2
(45) Date of Patent: Jul. 5, 2011

(54) METHOD AND DEVICE FOR THE CONTINUOUS CREATION OF A BAINITE STRUCTURE IN A CARBON STEEL, PARTICULARLY IN A STRIP STEEL

(75) Inventors: Werner Kaiser, Sundern (DE); Heinz Höfinghoff, Schalksmühle (DE); Hans-Toni Junius, Schwerte (DE); Michael Hellmann, Hemer (DE); Peter Ebner, Leonding (AT); Heribert Lochner, Leonding (AT)

(73) Assignees: C.D. Wälzholz GmbH, Hagen (DE); Ebner Industrieofenbau GmbH, Leonding (AT)

( * ) Notice: Subject to any disclaimer, the term of this patent is extended or adjusted under 35 U.S.C. 154(b) by 487 days.

(21) Appl. No.: 12/084,660

(22) PCT Filed: Oct. 31, 2006

(86) PCT No.: PCT/DE2006/001925
§ 371 (c)(1),
(2), (4) Date: May 7, 2008

(87) PCT Pub. No.: WO2007/054063
PCT Pub. Date: May 18, 2007

(65) Prior Publication Data
US 2009/0139616 A1    Jun. 4, 2009

(30) Foreign Application Priority Data

Nov. 10, 2005    (DE) .................... 10 2005 054 014

(51) Int. Cl.
*C21D 6/00*    (2006.01)
(52) U.S. Cl. ......... 148/663; 148/579; 148/645; 148/664
(58) Field of Classification Search .................. 148/579, 148/645, 660–664
See application file for complete search history.

(56) References Cited

U.S. PATENT DOCUMENTS

| 2,462,202 | A | | 2/1949 | Kniveton |
| 2,853,381 | A | * | 9/1958 | Klaybor ........................ 420/112 |
| 3,752,459 | A | | 8/1973 | Kawazoko et al. |
| 4,249,720 | A | | 2/1981 | Weyand et al. |
| 4,295,902 | A | | 10/1981 | Economopoulos |
| 2002/0100522 | A1 | | 8/2002 | Benton et al. |

FOREIGN PATENT DOCUMENTS

| DE | 20 61 726 | 8/1971 |
| EP | 0 006 841 | 1/1980 |

OTHER PUBLICATIONS

International Search Report for PCT/DE2006/001925, May 4, 2007.

* cited by examiner

*Primary Examiner* — Stanley Silverman
*Assistant Examiner* — Brian Walck
(74) *Attorney, Agent, or Firm* — Collard & Roe, P.C.

(57) ABSTRACT

A method continuously creates a bainite structure in a carbon steel, especially a strip steel by austenitizing the carbon steel; introducing the austenitized carbon steel into a bath containing a quenching agent; adjusting the carbon steel to the transformation temperature for bainite and maintaining the transformation temperature for a certain period of time; and then cooling the carbon steel. The carbon steel stays in the bath until a defined percentage of the bainite structure relative to the total structure of the carbon steel has formed. Residues of the quenching agent are removed from the surface of the carbon steel by blowing the same off when the carbon steel is discharged from the bath, and the remaining structure components of the carbon steel are then transformed into bainite in an isothermal tempering station without deflecting the carbon steel at all.

22 Claims, 1 Drawing Sheet

METHOD AND DEVICE FOR THE CONTINUOUS CREATION OF A BAINITE STRUCTURE IN A CARBON STEEL, PARTICULARLY IN A STRIP STEEL

CROSS REFERENCE TO RELATED APPLICATIONS

This application is the National Stage of PCT/DE2006/001925 filed on Oct. 31, 2006, which claims priority under 35 U.S.C. §119 of German Application No. 10 2005 054 014.7 filed Nov. 10, 2005. The international application under PCT article 21 (2) was not published in English.

BACKGROUND OF THE INVENTION

1. Field of the Invention

The present invention relates to a method for the continuous creation of a bainite structure in a carbon steel, particularly in a strip steel, in accordance with the preamble of claim 1, and to a corresponding device in accordance with claim 24.

Tempering of carbon steel, particularly of strip steel, using a pass-through method, is a method for influencing the strength properties of strip steel that is frequently practiced. In this connection, the strip steel is first hardened, by means of heating with subsequent cooling, in corresponding pass-through devices, and afterwards changed with regard to its impact resistance, by means of annealing followed by cooling. In this connection, the heat required for tempering both during hardening and during annealing can be introduced into the strip steel in different ways, for example by means of inductive heating, conductive methods, or also by passing the strip steel through hot baths or gas flames. In this connection, how the heat is introduced into the strip steel and how it is conducted out of the strip steel again during cooling has a significant influence on the material properties of the strip steel that are adjusted. Very many different possibilities for influencing the material properties of the strip steel result from the structure conversions and the speed of the heating and cooling processes, respectively, and the holding times at established temperatures and structures that are placed between them. Frequently, carbon steels are used as the material for such strip steel.

A particularly preferred structure in the tempering of carbon steels is the so-called bainite. The bainite structure has very good properties with regard to the processability of work pieces having such a bainite structure, and is therefore required in a great number of industrial applications, particularly also as a relatively thin sheet-metal material or the like. In this connection, the production of such a bainite structure must be followed very closely with regard to the treatment temperature, in order to bring about the desired structure not just as an approach, but rather in the entire structural structure of such a carbon steel. Thus, the production of a pure bainite structure, in particular, is a metallurgically complicated and error-prone procedure. It is of particular importance, in this connection, that after the carbon steel is austenitized, the creation of the bainite structure is guaranteed with precise adherence to isothermal conditions, so that no other structure components that impair the bainite structure are maintained in the carbon steel. A simple purpose of use, which makes few demands on the quality of the bainite structure, is the production of packaging strips.

2. The Prior Art

Depending on the quality of the bainite that is required, different production devices and therefore also process managements are fundamentally known for the production of different bainite structures. Thus, it is known from U.S. Pat. No. 6,632,301 B2, for example, to pass a strip steel through a metal melt bath for quenching after austenitizing, and to clean the strip of residues of the metal bath, at least for the most part, after the strip steel has been passed through the metal bath, whereupon the strip is passed and deflected in a chamber, in meander form, in which chamber the isothermal conversion of the carbon steel to the bainite structure takes place. A disadvantage of this method of procedure is that the properties of the carbon steel with regard to bainite formation are worsened by means of the many windings of the carbon steel in the isothermal conversion unit, and also, the planarity of such strips decreases.

Other methods for the production of a bainite structure are known, which bring about a conversion of the carbon steel entirely in a metal bath or the like, which means that the pass-through length and thus the metal bath itself must have very great dimensions, and therefore high fixed costs for filling the bath with metal or salt, and problems in the temperature expansion of this salt bath are brought about.

SUMMARY OF THE INVENTION

It is therefore the task of the present invention to propose a method and a device suitable for carrying out the method, with which the production of a high-quality bainite structure in a carbon steel can be carried out very precisely, and the properties of the bainite structure can be kept very uniform.

This object is accomplished by a method for the continuous creation of a bainite structure in a carbon steel, particularly in a strip steel, in which, in a first step, austenitizing of the carbon steel is carried out at a temperature above the austenitizing temperature, and afterwards, introduction of the austenitized carbon steel into a bath having a quenching agent for cooling the carbon steel to a temperature lower than the austenitizing temperature takes place, the carbon steel is set to the conversion temperature for bainite, and afterwards, the carbon steel is held at this conversion temperature over a period of time, and then, cooling of the carbon steel takes place. Such a method, of this type, is developed further in that after austenitizing, the carbon steel passes through a bath having a low amount of quenching agent, in terms of volume, and in this connection is brought into contact with the quenching agent for as long as until a proportion of the bainite structure of the total structure of the carbon steel, which proportion can be established, has formed in the bath having the quenching agent, residues of the quenching agent are removed from the surface of the carbon steel when the carbon steel exits from the bath, by means of the action of a gas, and subsequently, conversion of the remaining structure components of the carbon steel into bainite takes place in a subsequent isothermal tempering station, at the conversion temperature for bainite, without any deflection of the carbon steel when passing through the isothermal tempering station, for as long as until the bainite structure has formed completely within the carbon steel.

Dividing the creation of the bainite structure of the carbon steel into two consecutive sections, in the quenching agent, for one thing, and in the isothermal tempering station, for another, offers the advantage that the bath having the quenching agent can be kept relatively small, in terms of volume, and only part of the conversion of the bainite has to take place in this bath. At the same time, the pass-through length through the isothermal tempering station can also be minimized, since after all, part of the conversion already takes place in the bath having the quenching agent, and thus multiple deflection of the carbon steel within the isothermal tempering station, which would otherwise be necessary, is avoided. In this way, impairments of the planarity of a carbon steel, which might be configured as a strip steel, can be avoided; these cannot be avoided in the case of known methods for the production of bainite. Also, the change in the proportions of the formation of bainite in the bath and in the isothermal tempering station offers many different possibilities for influencing the formation of the bainite, and therefore also for being able to produce different qualities of the carbon steel. For this purpose, in particular, the temperature of the bath and the temperature of the isothermal tempering station, or the running time of the carbon steel through these two sections of bainite formation, respectively, can be varied.

It is furthermore of significant importance if removal of residues of the quenching agent from the surface of the carbon steel is carried out, in the region of the transition from the bath having the quenching agent into the isothermal tempering station, by means of the action of a gas. This removal of residues of the quenching agent from the surface of the carbon steel, carried out without contact, by means of the gas, is of great importance for the further treatment of the carbon steel, which is typically in strip form, in the isothermal tempering station, for one thing, but for another also in subsequent stations, since any entrainment of quenching agent can bring an impairment of the surface of the carbon steel with it, in that quenching agent is deposited on the carbon or changes the effect of other substances applied to the carbon steel from the outside. Also, in this manner, the situation is avoided that too much quenching agent is removed from the bath, and therefore constant refilling of the bath with fresh quenching agent is necessary, which would bring about unnecessary costs. In this connection, the use of gases for removing these residues of the quenching agent allows a gentle and precisely controllable possibility for removing such residues, which also prevents mechanical impairments of the surface of the carbon steel.

It is furthermore of importance for the quality of the carbon steel that is produced that a deflection of the carbon steel in the isothermal tempering station is prevented for as long as until the bainite structure has completely formed within the carbon steel, since any deflection or other mechanical stress on a bainite structure that is forming has negative effects on the quality, i.e. on the amount of the bainite structure that is formed, so that every type of deflection or other stress during passage of the carbon steel through the isothermal tempering station should be avoided. The proposed method eliminates significant disadvantages of known production methods for bainite structures particularly in this point, as well.

It is particularly advantageous if, in a further development of the method according to the invention, the action time of the bath having the quenching agent on the structure of the carbon steel is selected to be as long as until essentially half of the bainite structure of the carbon steel has formed in the bath having the quenching agent. In this way, the formation of the bainite structure can be controlled in such a manner that great jumps in the temperature of the carbon steel at the transition between the bath having the quenching agent and the isothermal tempering station, which would be more difficult to manage in the case of a creation of the bainite structure that has not been explained yet, can be reliably prevented. Fundamentally, however, it is also possible to create a lower or a higher proportion of the bainite structure than the approximately 50% indicated above within the bath having the quenching agent.

It is furthermore advantageous if the action time of the bath having the quenching agent and the dwell time of the carbon steel in the isothermal tempering station correspond to a typical total duration of bainite formation. In this way, complete conversion of the structure from the austenite phase to bainite can generally be achieved, in the case of typical carbon steels, whereby the division, as already described above, can be set differently in accordance with the formation of bainite structure in the bath and in the isothermal tempering station.

It is important for the success in the production of a complete conversion of the structure of the carbon steel to bainite that the transition from the bath having the quenching agent to the isothermal tempering station essentially takes place without any temperature change of the carbon steel, with continuing formation of the bainite structure. The production of the bainite requires precisely defined temperature conditions during the relatively long period of creation of the bainite structure, whereby even slight changes in the temperature of the carbon steel during this time can have significant effects on the quality of the structure. Since different contact conditions of the surroundings with the carbon steel can occur between the bath having the quenching agent and the isothermal tempering station (on the one hand, typically a metal/salt mixture in the bath, and inert gas in the isothermal tempering station), and furthermore, this media jump can also bring about sudden changes in the temperature of the carbon steel when it passes out of the bath into the isothermal tempering station, it is particularly important to entirely avoid the temperature peak that might occur in this connection, or to limit it to permissible values. If this temperature peak is not avoided or limited, then a different structural state than the desired state of the bainite structure will occur as the carbon steel passes through this temperature peak, at the interface between bath and tempering station, at least for a short time, and this reduces the quality of the bainite structure as a whole.

It can also be advantageous for improving the transition between the bath having the quenching agent and the isothermal tempering station if the transition of the carbon steel from the austenitizing station into the bath having the tempering agent takes place essentially perpendicular to the bath surface. In this way, very uniform and definable properties with regard to the exit of the carbon steel from the bath are obtained, and, at the same time, entrainment of quenching agent out of the bath is minimized, by means of the abrupt perpendicular exit of the carbon steel out of the bath.

In an advantageous embodiment, it is possible that the removal of residues of the bath from the surface of the carbon steel is carried out by means of blowing the quenching agent off the carbon steel by means of gas. Such blowing-off takes place without contact, and therefore does not change the surface of the carbon steel, as a method with contact, such as using a squeegee or drawing the carbon steel through a seal that makes contact could bring about. For another thing, blowing-off is very reliable and effective if the media flows are set appropriately, and also, devices that might be necessary in a removal method that uses contact are not subject to wear, because of the contact-free method of effect. In this connection, it is possible that blowing-off of the quenching agent takes place under a protective gas atmosphere. Blowing the quenching agent off under a protective gas atmosphere ensures that no air can reach the surface of the carbon steel in the region of the transition between the bath having the quenching agent and the isothermal tempering station, and therefore a change in the surface of the carbon steel, for example due to oxidation or other processes in connection with the entry of air is not impaired.

It is furthermore advantageous, in this connection, if blowing-off of the quenching agent takes place by means of tempered gases, particularly by means of tempered inert gases.

Very precise temperature control of the temperature of the carbon steel can be achieved by means of tempering the gases or inert gases that blow the quenching agent off the carbon steel, and as a result, the creation of the bainite structure is not impaired, despite the ongoing blowing-off, and the bainite structure is not changed. Thus, tempering of the gases for blowing the quenching agent off the carbon steel can be adjusted in such a manner that a change in the temperature of the carbon steel during ongoing creation of the bainite structure is avoided, thereby making it possible to compensate temperature changes within the carbon steel that might occur in the region of the transition between the bath having the quenching agent and the isothermal tempering station. An increase in the temperature of the carbon steel after it exits from the bath, due to the ongoing conversion of the structure due to the transition into the gaseous environment of the isothermal tempering station, could otherwise lead to overheating of the carbon steel, with negative effects on the quality of the bainite structure. For this purpose, the tempering of the gases for blowing the quenching agent off the carbon steel can be regulated, in a further embodiment, in such a manner that the conversion heat in the carbon steel that occurs upon its departure from the bath having the quenching agent is carried away by the tempered inert gases, and the temperature of the carbon steel is held essentially constant at the conversion temperature for bainite.

Furthermore, it is of great importance for the quality of the bainite structure that no deflection of the carbon steel by deflection rollers is carried out in the region of blowing-off of the quenching agent. A deflection of the carbon steel in this region, during formation of the bainite structure, necessarily changes the bainite structure that is forming, by means of mechanical effects and a change in the temperature behavior, so that the quality of the bainite structure can only be guaranteed by means avoiding a corresponding deflection. This can be achieved, for example, in that the transition of the carbon steel from the bath having the quenching agent to the isothermal tempering station takes place essentially perpendicular to the bath surface. The carbon steel enters into the region of blowing-off of the quenching agent perpendicular to the bath surface, and from there continues upward in perpendicular manner, so that the deflection of the carbon steel takes place still completely within the bath and therefore under very uniform conditions within the bath. In this connection, the deflection within the bath has little to no influence on the creation of the bainite structure, since here, the bath exerts a corresponding buffer effect on the temperature management of the carbon steel.

Furthermore, it is significant that the length of the isothermal temperature management in the isothermal tempering station is set up as a function of the pass-through speed of the carbon steel, in such a manner that a complete bainite structure can form in the carbon steel within the isothermal tempering station. The remaining conversion of the not yet bainite structure of the carbon steel, which has not yet reached the desired bainite state on the basis of the process management in the bath having the quenching agent, takes place, in this connection, under conditions within the isothermal tempering station that remain very uniform, which station essentially guarantees identical conditions over a longer section of the path of the carbon steel, and, in this connection, does not exert any negative influences of a mechanical or thermal nature on the carbon steel. Only in the region of the end of the path of the carbon steel through the isothermal tempering station is a complete bainite structure then present in the carbon steel, whereby the length of the isothermal tempering station can be designed with appropriate reserves so that complete conversion to a bainite structure is always assured, even at different pass-through speeds of the carbon steel through the isothermal tempering station.

Furthermore, it is advantageous if the carbon steel passes through a cooling device after the bainite structure has been completely formed, in which device the carbon steel is cooled to a temperature that prevents changes in the surface, particularly oxidation or color changes in the surface. Targeted cooling of the bainite structure of the carbon steel that has been formed, as short as possible, ensures that the bainite structure that has been formed cannot change further, in impermissible manner, by means of subsequent structural changes, or that the surface of the carbon steel does not change as the result of oxidation or other changes related to the surroundings of the carbon steel, in a manner that the finished product, carbon steel, is not supposed to demonstrate. The shorter this cooling process is kept, the less time other influence variables have to bring about impermissible changes of the bainite carbon steel. In this connection, in a further development, the cooling device can also be operated under a protective gas atmosphere, in order to prevent surface changes, particularly oxidation or color changes of the surface. However, it is also possible that in another embodiment, the cooling device is also operated under air, in targeted manner, in order to produce a surface change in the form of bluing of the carbon steel. Such surfaces of the carbon steel are required or practical for many application purposes of such carbon steels. Impermissible changes in the surface of the carbon steel can be avoided if the carbon steel exits from the cooling device at an exit temperature of essentially 100° C. or less. At these temperatures, thermal activation of the surface of the carbon steel is only slight, any longer, and generally does not lead to impermissible changes in the surface.

It is particularly advantageous if a metal bath is used as the quenching agent. Such metal baths are fundamentally known from the tempering of carbon steels, whereby for the present method, it is advantageous if a salt/lead/bismuth bath is used as the metal bath. By means of this composition of the metal bath, the result is achieved that the appropriate temperature properties and also the wetting properties and the buffer effect of the metal bath for the production of a bainite structure are reliably guaranteed.

An improvement in the heating conditions of the carbon steel before it enters into the austenitizing station can be achieved if the carbon steel that runs into the austenitizing station and is still relatively cold passes through a warming bath, preferably a region of the bath having the quenching agent, before it runs into the austenitizing station. Such a warming bath and, in particular, also the bath having the quenching agent, allow very uniform heating of the carbon steel, whereby at the same time, utilization of the conversion heat that occurs in any case, in the subsequent phase of the formation of the bainite structure, during quenching of the carbon steel, is made possible, by means of immersion in the bath having the quenching agent. In this way, the bath having the quenching agent can be kept at the conversion temperature for the bainite formation of the carbon steel, since the carbon steel passes through this bath even before entering into the austenitizing station, and gives off the quenching heat given off during cooling of the carbon steel after austenitizing to the carbon steel that is running into the austenitizing station, which is still relatively cold, and then afterwards runs into the austenitizing station.

A further improvement in the conditions during heating of the carbon steel for austenitizing can be achieved if the carbon steel is guided, in the region of austenitizing of the carbon steel, in such a manner that the carbon steel that is running into the austenitizing station, and is still relatively cold, is also warmed by heat radiation of the carbon steel that has been brought to the austenitizing temperature, on the run-out side of the austenitizing station. By means of the heat radiation that is given off into the surroundings by the section of the carbon steel that is already at austenitizing temperature, the section of the carbon steel that is still in the run-in region can be automatically heated, as well, and thereby better homogenization of the carbon steel in the austenite phase and thus improved solubility of the carbon within the carbon steel can be achieved. In this way, the formation of the bainite structure is also promoted, without any additional costs for heating the carbon steel being caused. In this way, the result is achieved that the heat radiation of the carbon steel that has already been tempered to a higher temperature, which heat is given off to the carbon steel that is running in and is still relatively cold, heats the carbon steel very uniformly on the run-out side from the austenitizing station, and brings about stationary tempering conditions during austenitizing, as well as homogenization of the austenite structure of the carbon steel. Furthermore, the quality of heating of the carbon steel can be improved in that the dwell time of the carbon steel in the austenitizing station, under the influence of the radiation heat that is given off by the carbon steel that has already been tempered to a higher temperature, is selected to be so long that a homogeneous austenite structure forms in the carbon steel.

A possible heating method for the carbon steel in the austenitizing station can be inductive heating of the carbon steel. Of course, other heating methods that are usually used in tempering technology are also possible.

The invention furthermore describes a device for the creation of a bainite or sorbite structure in a carbon steel, particularly in a strip steel, for carrying out a method according to claim 1, whereby the device has an austenitizing station with which the carbon steel is brought to a temperature above the austenitizing temperature, furthermore a bath having a quenching agent for cooling the austenitized carbon steel to a temperature lower than the austenitizing temperature, and an isothermal tempering station for holding the carbon steel at this conversion temperature for a period of time, and finally, a cooling station for subsequently cooling the carbon steel. Such a device is developed further in that the isothermal tempering station is essentially configured vertically, in tower-like manner, and the length of the free pass-through of the carbon steel through the isothermal tempering station allows conversion of the remaining structure into bainite, without deflection of the carbon steel. This is important because the length of the free pass-through of the carbon steel within the isothermal tempering station should be configured at least in such a manner that the conversion of the remaining structure into bainite can take place without deflection or other mechanical influence on the carbon steel. Negative influences on the creation of the bainite could be brought about by means of deflection or other mechanical influence on the carbon steel during formation of the bainite in the isothermal tempering station, and could cause a deterioration of the quality properties of the carbon steel produced in this manner. For this reason, the remaining formation of the bainite in the isothermal tempering station should take place without any other mechanical influences, for example by means of deflections or the like, and only after formation of the complete bainite structure of the carbon steel is finished should any mechanical influence take place again.

Furthermore, it is advantageous if the volume of the quenching agent in the bath can be minimized by means of the formation of the bainite structure at a proportion of the bainite structure of the total structure of the carbon steel, which proportion can be established. In this connection, the first conversion step, which is essential for triggering the conversion to the bainite structure, can take place in the bath having the quenching agent, whereby the remaining conversion then takes place in the subsequent isothermal tempering station. Since the gradient of the creation of the bainite structure does not run in linear manner over the duration of the action of the conversion temperature of the bainite, the required amount of quenching agent can be reduced, with relatively small amounts of quenching agent and a longer action of the temperature in the isothermal tempering station, in terms of time, relative to this, and thus the bath having the quenching agent can be dimensioned significantly smaller, overall, than if the conversion to the bainite structure had to take place completely within such a bath. Also, the length of the pass-through time through the isothermal tempering station can be minimized by means of the very intensive conversion to the bainite structure that takes place within the bath having the quenching agent, thereby making it possible to entirely avoid or at least very clearly reduce the deflections of the carbon steel within such an isothermal tempering station that are usual otherwise. As a result, the economic efficiency of the production method is increased, with a simultaneous improvement in the quality of the bainite structure, but also, the costs for implementing such a method, in terms of the system, can be clearly reduced in this way.

It is furthermore important that deflection rollers are disposed within the bath having the quenching agent, in such a manner that removing the carbon steel from the bath and placing it into the isothermal tempering station, and/or immersing the carbon steel into the bath from the austenitizing station take place essentially vertically. In this way, a very definite and uniform transition of the carbon steel into the bath and, in particular, also out of the bath into the isothermal tempering station can be achieved, which transition is of central importance for maintaining the temperature progression during creation of the bainite structure. By means of arranging the deflection roller within the quenching agent and keeping the temperature of the deflection rollers identical to that of the quenching agent, negative influences of the deflection, i.e. of the deflection rollers on the structure creation are avoided, to the greatest possible extent.

Furthermore, it is possible that a device for removing residues of the quenching agent from the surface of the carbon steel, particularly a blowing-off device for blowing the quenching agent off the carbon steel, is disposed between the bath having the quenching agent and the isothermal tempering station. Such a device for removing residues of the bath from the surface of the carbon steel serves to keep the quenching agent of the bath together as much as possible, for one thing, and thereby to minimize losses from entrainment of the quenching agent, and, for another thing, such residues of the quenching agent on the surface of the carbon steel might have disadvantageous effects for subsequent treatment steps, and therefore must be avoided.

In another embodiment, it is possible that regulated protective gas heating systems or water heat exchangers are disposed in the isothermal tempering station and/or the cooling station, to temper the protective gas atmosphere. By means of such heat exchangers, it is possible to achieve very sensitive regulation of the protective gas atmosphere in the isothermal tempering station, with regard to its temperature.

Furthermore, a protective gas atmosphere in the isothermal tempering station can be tempered by means of a heating device. Of course, other heating techniques for the protective gas atmosphere within the isothermal tempering station are also possible.

It is advantageous for the implementation of the device, in terms of a system, if the isothermal tempering station and/or the cooling device are accommodated in a tower-like housing that is disposed vertically and is possibly a common housing. By means of such a tower-like housing, the required construction space for the guidance of the carbon through the isothermal tempering station and the cooling device, which guidance is vertical in this region, is minimized, whereby in a further embodiment, the tower-like housing can be subdivided in such a manner that the carbon steel to be kept isothermal passes out of the bath having the quenching agent, in a first chamber, vertically from the bottom to the top, and the carbon steel that is to be cooled and has now been completely converted to bainite passes through in a second chamber, disposed adjacent to the first, vertically from the top to the bottom. In this way, the treatment steps that follow directly one after the other are carried out very compactly, also in terms of space, one behind the other, during further processing of the structure that has partly been converted to bainite.

In another embodiment, a deflection unit can be disposed at the uppermost point of the tower-like housing, with which unit the carbon steel, which has been completely converted to bainite there, is deflected out of the isothermal tempering station into a cooling station. This deflection at the uppermost point of the tower-like housing contributes to the compact construction of the two treatment chambers disposed in the tower-like housing.

In another advantageous embodiment, the device can also be used for the creation of a sorbite structure, in that the bath having the quenching agent is held at a temperature that is required for conversion of the carbon steel to sorbite, and the carbon steel is brought into contact with the quenching agent as long as until the sorbite structure has formed, completely or almost completely, and subsequently, in the subsequent isothermal tempering station, essentially all that can be carried out is cooling of the carbon steel having the sorbite structure that has formed. In this way, the result is achieved that both the production of a bainite structure and that of a sorbite structure can be carried out using the same system, without major rebuilding of the system being necessary between the different production procedures. All that has to be done is to ensure that the temperatures in the metal bath and in the isothermal tempering station, respectively, and the pass-through speeds of the carbon steel be adapted to the creation of a sorbite structure, whereby the action of the isothermal tempering station, in the case of the creation of a sorbite structure, actually consists more of cooling the sorbite structure that has almost completely formed during the pass through the bath. In this way, the economic efficiency of utilizing a corresponding system is increased once again.

A particularly advantageous embodiment of the device according to the invention, for carrying out the method, is shown in the drawing.

BRIEF DESCRIPTION OF THE DRAWINGS

The drawing shows.

DETAILED DESCRIPTION OF THE PREFERRED EMBODIMENTS

Figure 1:
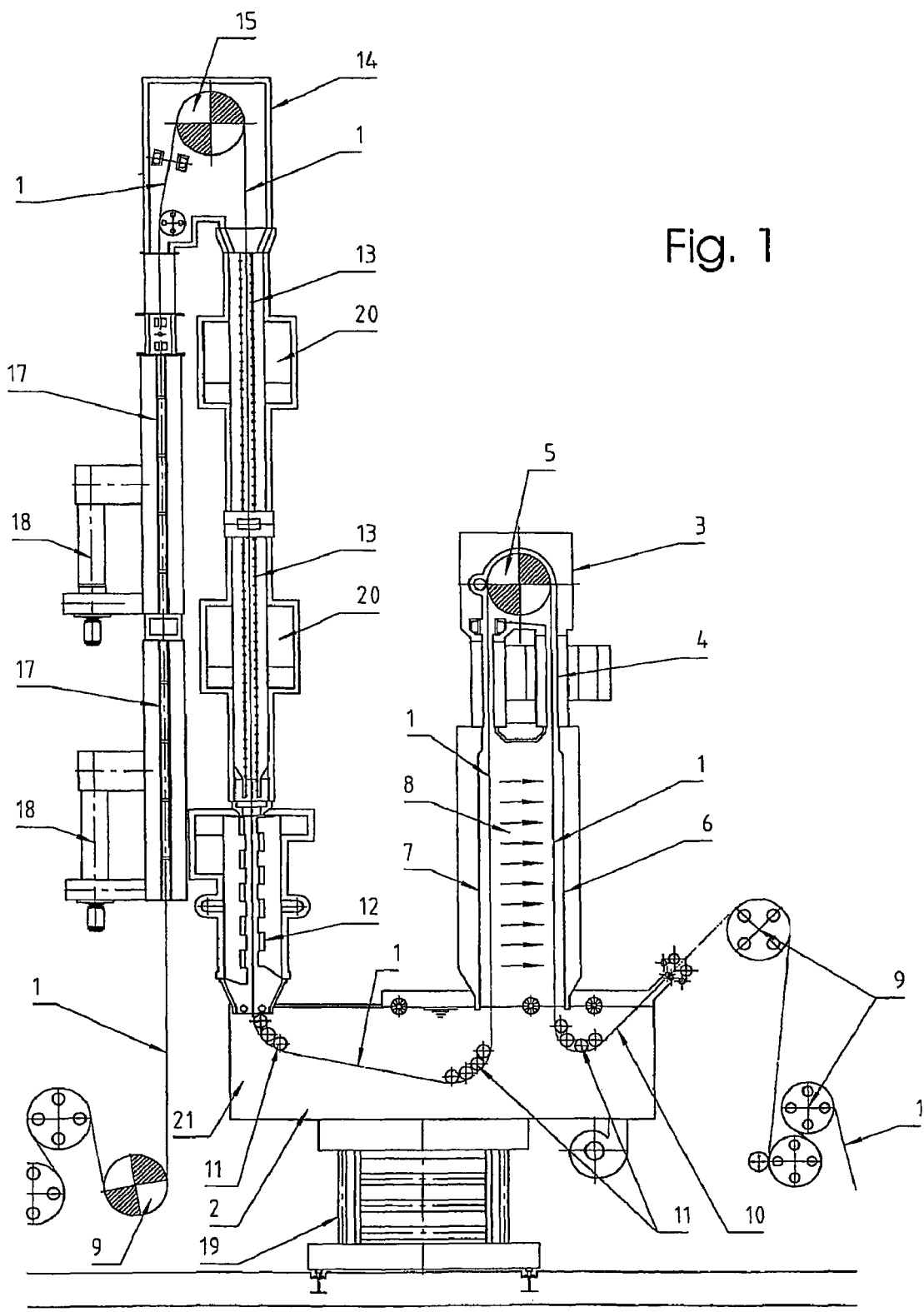
FIG. 1—a very schematic representation of the fundamental structure of a device according to the present invention, in section, and restricted to the essential device components.

FIG. 1 shows a very schematic representation of the structure of a device for carrying out the method according to the invention, whereby the fundamental method sequence also becomes evident from this.

The device now shows the essential sections of such a system for carrying out the method according to the invention, which relate directly to tempering in the production of the bainite structure. The carbon steel 1 runs, on the run-in side—shown on the right in FIG. 1—by way of various rollers 9, from a wind-up unit, not shown, into the region of the pre-warming zone 10, the bath 2 having the quenching agent 21, where the carbon steel 1 is passed through the quenching agent 21, which has already been heated, by way of rollers 11 disposed there. The quenching agent 21 is heated up in a manner to be described in greater detail below, in the left part of the bath 2, by means of quenching the carbon steel 1 that enters the bath 2 there, after having passed through the austenitizing station 3. In this way, the carbon steel 1 is pre-heated in the pre-warming zone 10, and then enters vertically upward into the austenitizing station 3, in which the carbon steel 1 is heated to the range of the austenitizing temperature by way of inductive heating 4, for example, in a heating zone 6. In the upper region of the austenitizing station 3, a deflection unit 5 is shown, and after passing through it, the carbon steel 1 is transported vertically downward again, in the direction towards the bath 2. In this equalization zone 7, the carbon steel 1 is then heated to the final austenitizing temperature, whereby it assumes a very homogeneous austenite structure as a result of equalization processes, and, in this connection, also gives off heat radiation 8 in the direction towards the heating zone 6, which heat impacts the carbon steel 1 that is just passing through there, and also heats it. As a result of this arrangement of the functional elements within the austenitizing station 3, the carbon steel 1 is heated very uniformly, and it is ensured that the carbon goes into uniform solution within the carbon steel 1.

After the carbon steel 1 exits from the austenitizing station 3 on the underside, in the direction of the bath 2, the carbon steel 1 is again deflected by way of deflection rollers 11 disposed in the bath 2, and, in this connection, is cooled in the quenching agent 21. In this connection, the quenching agent 21 is adjusted to a temperature, for the purpose of forming bainite structure, that lies at approximately 400° Celsius and is typically used for carbon steels 1, for the production of bainite structure. As the carbon steel 1 passes through the bath 2 in the direction towards the deflection rollers 11 disposed on the left, below the tower-like housing 14, the carbon steel 1 cools to the bainitizing temperature, whereby a part of the structure of the carbon steel 1 converts to a bainite structure. Depending on the length of the pass through the bath 2, a different proportion of the austenite structure of the carbon steel 1 is converted to bainite structure; typically, this proportion is selected in such a manner that about half of the austenite structure is converted to bainite structure.

After running through the bath 2, the carbon steel 1 is guided vertically upward, on the deflection rollers 11 disposed on the left, into a tower-like housing 14 having an isothermal tempering station 13 and heat exchangers 20 disposed thereon, in which the remaining creation of the bainite structure is carried out, in a manner to be described below. Before that, the carbon steel 1 still enters into the region of a blowing-off unit 12, in which residual quenching agent 21 is blown off the surface of the carbon steel 1 by means of a jet blower. In this connection, it is particularly important that this jet blowing-off 12, which is actually known, is carried out by means of inert gases, for example, at such temperatures that the carbon steel 1 does not have a temperature peak when passing through this jet blowing-off 12, if at all possible, but rather the formation of the bainite continues to proceed as undisturbed as possible in this region, and can be carried out to its end in the region of the isothermal tempering station 13.

The fact that the carbon steel 1 is both introduced vertically into the bath 2, coming from the austenitizing station 3, and exits vertically upward from the bath 2 again, into the region of the blowing-off unit 12, and the deflection of the carbon steel 1 takes place exclusively within the bath 2, also contributes to this.

The isothermal tempering station 13 now contains an inert gas, for example, which is kept at a temperature, by way of appropriate tempering by means of the heat exchangers 20, such that the bainitizing temperature is present as uniformly as possible within the isothermal tempering station 13. In this way, and because of the fact that the carbon steel 1 does not undergo any mechanical stress in the isothermal tempering station 13, the remaining structure of the carbon steel 1, which has not yet formed in the bath 2, can convert completely to bainite structure, so that at the end of the isothermal tempering station 13, and just ahead of the deflection unit 15, the carbon steel 1 has a completely bainite structure.

After passing through the isothermal tempering station 13, the carbon steel 1 is then guided into the adjacent region of the tower-like housing 14, by way of the deflection unit 15, where it runs into a cooling unit 17, 18, in which cooling of the carbon steel 1 is carried out, once again, for example by way of an inert gas. In this connection, the coolers 18 lower the temperature of the inert gas within the cooling unit 17, in such a manner that cooling of the carbon steel 1 in the exit region from the cooling unit 17 lies at 100° C. or less. From there, the carbon steel 1 is passed to a wind-up unit, not shown, by way of a roller 9.

The bath 2 can be adjusted in height by way of a lifting table 19, in such a manner that maintenance work on the bath 2 or on the undersides of the austenitizing station 3, or on the tower-like housing 14, can be carried out, for example.

With regard to the metallurgy and process technology details that take place in the device, reference is made to the description of the method according to the invention, above.

REFERENCE NUMBER LIST

1—carbon steel
2—metal bath
3—austenitizing station
4—inductive heating
5—deflection unit
6—heating zone
7—equalization zone
8—heat radiation
9—rollers
10—pre-warming zone
11 deflection rollers in the metal bath
12 blowing-off unit
13—isothermal tempering station
14—tower-like housing
15—deflection unit
17—cooling unit
18—cooler(s)
19—lifting table
20—heat exchanger(s)
21—quenching agent

The invention claimed is:

1. A method for the continuous creation of a bainite structure in a carbon steel, the carbon steel being a strip steel, the method comprising the steps of:
  austenitizing of the carbon steel at a temperature above an austenitizing temperature of the carbon steel;
  introduction of the austenitized carbon steel into a bath having a quenching agent for cooling the carbon steel to a temperature lower than the austenitizing temperature, the quenching agent contacting the austenitized carbon steel in the bath for as long as until a proportion of the bainite structure of the total structure of the carbon steel has formed, the carbon steel reaching the conversion temperature for bainite in the bath;
  discharging the carbon steel from the bath and removing residues of the quenching agent from a surface of the carbon steel when the carbon steel exits the bath, the residues being removed from the carbon steel via action of a gas;
  subsequently, bringing the carbon steel into an isothermal tempering station, the isothermal tempering station having the conversion temperature of bainite so that the carbon steel is held at the conversion temperature of bainite, and remaining structure components of the carbon steel are converted into bainite in the isothermal tempering station, the conversion of the remaining structure components occurring without any deflection of the carbon steel when passing through the isothermal tempering station, the carbon steel remaining in the isothermal tempering station for as long as until the bainite structure has formed completely within the carbon steel; and
  then, cooling the carbon steel.

2. The method according to claim 1, wherein an action time of the bath having the quenching agent on the structure of the carbon steel is selected to be as long as until essentially half of the bainite structure of the carbon steel has formed in the bath having the quenching agent.

3. The method according to claim 1, wherein transition from the bath having the quenching agent to the isothermal tempering station essentially takes place without any temperature change of the carbon steel, with continuing formation of the bainite structure.

4. The method according to claim 1, wherein the action of the gas for removal of residues of the quenching agent from the surface of the carbon steel is carried out via blowing-off of the quenching agent from the carbon steel.

5. The method according to claim 4, wherein the blowing-off of the quenching agent takes place under a protective gas atmosphere.

6. The method according to claim 4, wherein a temperature of the gas is adjusted in such a manner that a change in the temperature of the carbon steel during ongoing creation of the bainite structure is avoided.

7. The method according to claim 6, wherein the temperature of the gas is regulated in such a manner that conversion heat in the carbon steel occurring upon the exit of the carbon steel from the bath having the quenching agent is carried away by the gas, and the temperature of the carbon steel is held essentially constant at the conversion temperature for bainite.

8. The method according to claim 4, wherein no deflection of the carbon steel is carried out in a region of the blowing-off of the quenching agent.

9. The method according to claim 1, wherein a length of isothermal temperature management in the isothermal tempering station is set up as a function of pass-through speed of the carbon steel, in such a manner that a complete bainite structure can form in the carbon steel within the isothermal tempering station.

10. The method according to claim 1, wherein the cooling of the carbon steel after the bainite formation has been entirely completed occurs as the carbon steel runs through a cooling device.

11. The method according to claim 10, wherein the carbon steel is cooled in the cooling device to a temperature that prevents oxidation or color changes in the surface of the carbon steel.

12. The method according to claim 10, wherein the cooling device is operated under a protective gas atmosphere in order to prevent oxidation or color changes of the surface of the carbon steel.

13. The method according to claim 10, wherein the cooling device is operated under air, in order to produce a surface change in the form of bluing of the carbon steel.

14. The method according to claim 10, wherein the carbon steel exits from the cooling device at an exit temperature of essentially 100° C. or less.

15. The method according to claim 1, wherein a metal bath is used as the quenching agent.

16. The method according to claim 15, wherein a salt/lead/bismuth bath is used as the metal bath.

17. The method according to claim 1, wherein the austenitizing of the carbon steel occurs in an austenitizing station after the carbon steel enters the austenitizing station; and
further comprising the step of:
passing the carbon steel through a warming bath before the carbon steel enters the austenitizing station.

18. The method according to claim 17, wherein the warming bath is the bath having the quenching agent; and
wherein the bath having the quenching agent can be kept at the conversion temperature for the bainite formation of the carbon steel in that after the austenitizing, the austenitized carbon steel in the bath gives off, during cooling in the bath, quenching heat to the carbon steel in the bath that has not yet entered the austenitizing station.

19. The method according to claim 1, wherein the austenitizing of the carbon steel occurs in an austenitizing station after the carbon steel enters the austenitizing station; and
wherein the carbon steel is guided, in a region of the austenitizing of the carbon steel, in such a manner that the carbon steel entering the austenitizing station is also warmed by heat radiation of the austenitized carbon steel, the austenitized carbon steel being on a run-out side of the austenitizing station, the austenitized carbon steel having the austenitizing temperature.

20. The method according to claim 19, wherein the heat radiation heats the carbon steel entering the austenitizing station substantially uniformly and brings about stationary tempering conditions during the austenitizing, as well as homogenization of the austenite structure of the carbon steel.

21. The method according to claim 19, wherein a dwell time of the carbon steel in the austenitizing station, under an influence of the heat radiation, is selected to be so long that a homogeneous austenite structure forms in the carbon steel.

22. The method according to claim 1, wherein the austenitizing of the carbon steel occurs in an austenitizing station after the carbon steel enters the austenitizing station; and
wherein the carbon steel is inductively heated in the austenitizing station.

\* \* \* \* \*